United States Patent
Ogawa et al.

(10) Patent No.: US 11,330,056 B2
(45) Date of Patent: May 10, 2022

(54) STORAGE SYSTEM AND CONTROLLER LOCATION METHOD

(71) Applicant: Hitachi, Ltd., Tokyo (JP)

(72) Inventors: Shugo Ogawa, Tokyo (JP); Ryosuke Tatsumi, Tokyo (JP); Yoshinori Ohira, Tokyo (JP); Koji Hosogi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/018,649

(22) Filed: Sep. 11, 2020

(65) Prior Publication Data

US 2021/0194959 A1 Jun. 24, 2021

(30) Foreign Application Priority Data

Dec. 19, 2019 (JP) .............................. JP2019-229819

(51) Int. Cl.
*H04L 67/1097* (2022.01)
*G06F 3/06* (2006.01)
*H04L 67/62* (2022.01)
*H04L 67/63* (2022.01)

(52) U.S. Cl.
CPC .......... *H04L 67/1097* (2013.01); *G06F 3/061* (2013.01); *G06F 3/067* (2013.01); *G06F 3/0658* (2013.01); *H04L 67/325* (2013.01); *H04L 67/327* (2013.01)

(58) Field of Classification Search
CPC ............. H04L 67/1095; H04L 67/1097; H04L 67/327; H04L 67/325; G06F 3/0658
See application file for complete search history.

(56) References Cited

U.S. PATENT DOCUMENTS

| | | | | |
|---|---|---|---|---|
| 2006/0023574 A1* | 2/2006 | Weisser | ............... | G06F 13/4022 369/30.1 |
| 2008/0155215 A1* | 6/2008 | Matsuzaki | .......... | G06F 11/1456 711/E12.103 |
| 2010/0312967 A1* | 12/2010 | Kasai | ................. | G06F 12/0866 711/E12.001 |
| 2012/0023292 A1* | 1/2012 | Saito | ..................... | G06F 1/3268 711/170 |
| 2013/0018987 A1* | 1/2013 | Seaman | ............... | H04L 67/327 709/218 |
| 2015/0281352 A1* | 10/2015 | Nakatsugawa | ..... | H04L 67/1097 709/217 |

(Continued)

FOREIGN PATENT DOCUMENTS

WO 2016/203629 A1 12/2016

*Primary Examiner* — Mahran Y Abu Roumi
(74) *Attorney, Agent, or Firm* — Procopio, Cory, Hargreaves & Savitch LLP

(57) ABSTRACT

A possible performance bottleneck associated with insufficient network bands is mitigated to allow improvement of access performance of a storage system.
A storage system includes a first node with a storage medium of storage and a plurality of second nodes each with a controller function for the storage, and is communicatively connected to a host providing an access request to the storage. One of the plurality of second nodes is determined to be a node to which a controller function executing access processing on the storage is assigned on the basis of a first amount of data transfer between the second node and the host and a second amount of data transfer between the second node and the first node.

13 Claims, 10 Drawing Sheets

(56) References Cited

U.S. PATENT DOCUMENTS

| | | | |
|---|---|---|---|
| 2016/0044072 A1* | 2/2016 | Uekubo | G11B 27/031 |
| | | | 709/204 |
| 2016/0226975 A1* | 8/2016 | Kubota | H04L 67/1097 |
| 2017/0289003 A1* | 10/2017 | Iwakura | H04L 43/12 |
| 2017/0357589 A1* | 12/2017 | Izawa | G06F 12/0888 |
| 2018/0267922 A1* | 9/2018 | Nara | G06F 3/0623 |
| 2021/0014932 A1* | 1/2021 | Mbonye | H04W 80/10 |

\* cited by examiner

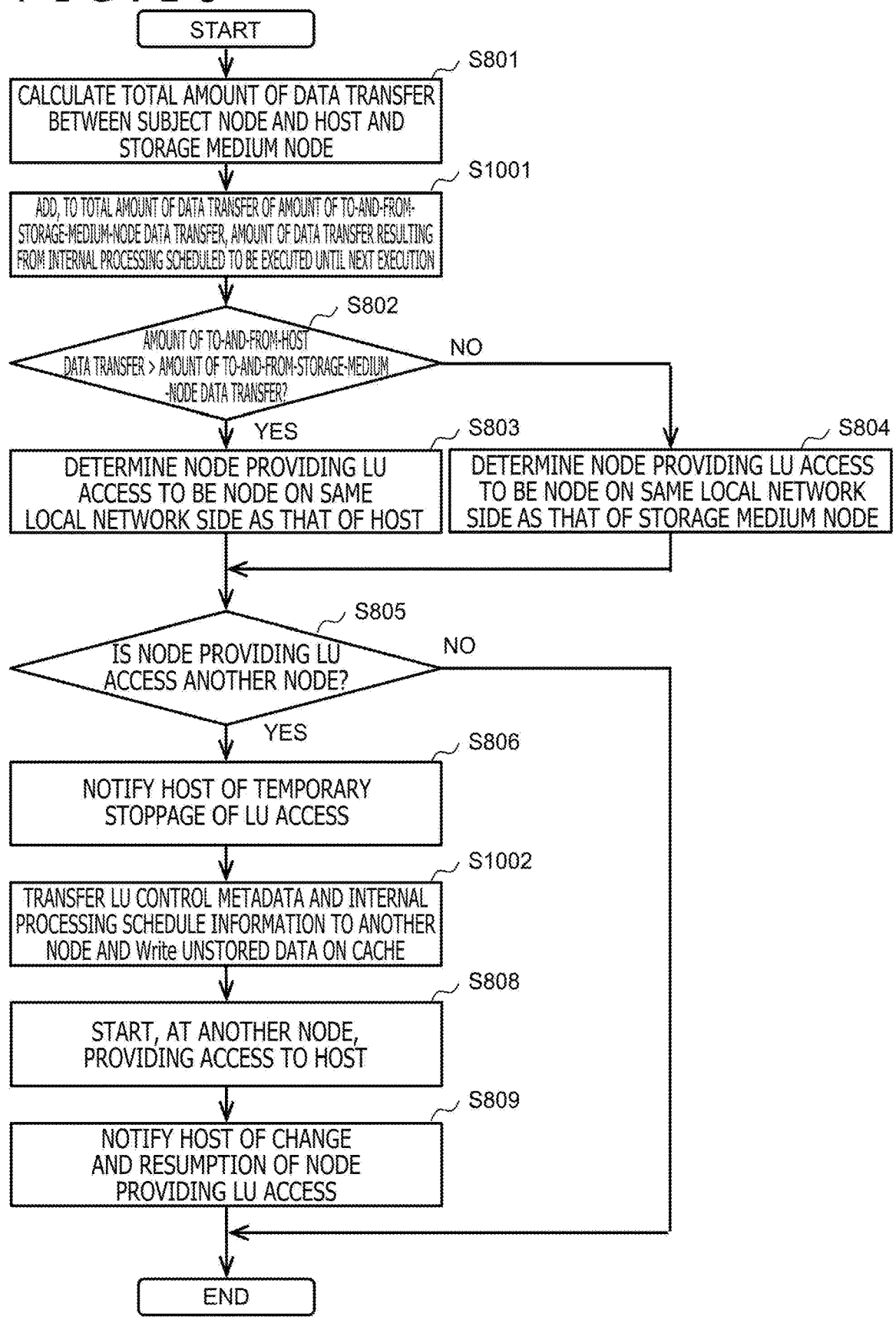

STORAGE SYSTEM AND CONTROLLER LOCATION METHOD

BACKGROUND OF THE INVENTION

1. Field of the Invention

The present invention relates to a storage system including nodes connected together by a network and determining assignment of a node with a controller function and a controller assignment method.

2. Description of the Related Art

In order to satisfy wide-range requests for access performance and storage capacity, storage systems used in recent computer environments use an architecture in which a network is used to connect a node with a controller function processing access requests to storage and a node storing a storage medium. In such a storage system, the processing performance and the storage capacity can be adjusted and added by connecting, to the network, a required number of nodes each with a controller function (controllers) and a required number of nodes each with a storage medium (storage medium nodes). Among the controllers, each node with a controller function executing access processing transfers, to and from a storage medium node or another controller, data stored in the storage medium. At this time, in a case where nodes transferring data have insufficient network bands, a performance bottleneck occurs.

Thus, in a storage system using the above-described architecture, the amount of data transfer between the nodes needs to be reduced to mitigate a bottleneck caused by insufficient network bands. An example of means for reducing the amount of data transfer in access processing includes caching by the controller. Caching storage data in a storage medium allows the amount of data transfer between the controller node and the storage medium node.

However, in a storage system including a plurality of nodes each with the controller function, even in a case where data is present on a cache, data transfer takes place in a case where the controller function executing the access processing is present in a node different from the cache. Accordingly, to mitigate degraded performance in a storage system including a plurality of nodes each with the controller function, it is important to optimize assignment of the controller function to a plurality of nodes connected by the network.

An example of a method for controlling assignment of the controller function to a plurality of nodes connected by a network includes a method described in PCT Patent Publication No. WO2016/203629. In the cache controlling method described in PCT Patent Publication No. WO2016/203629, a cache-destination storage apparatus is determined on the basis of at least one of a target I/O pattern and a target connection form to reduce the number of times that I/O data is transferred from a cache memory area toward a host.

SUMMARY OF THE INVENTION

Typically, the storage system is connected to an access requesting host via a network. In other words, in a storage system including a plurality of nodes connected by the network, data transfer associated with an access request from a host takes place not only between a node with the controller function and a node with a storage medium (controller-storage medium) but also between the host and the node with the controller function (host-controller).

However, the cache controlling method in PCT Patent Publication No. WO2016/203629 holds promise for reduction in the amount of data transfer between the controller and the storage medium but does not take into account the data transfer between the host and the controller. Thus, there is a problem in that the data transfer between the host and the controller may be a bottleneck associated with insufficient bands in the network.

Additionally, in the above-described two data transfers, data transfer paths with narrow bands are likely to include insufficient bands, and thus avoidance of degraded performance of the storage system requires minimization of the amount of data transfer using a data transfer path with a narrow band.

For example, in a case where a storage system in which a node with the controller function (controller) and a storage medium node are connected to the same network switch is accessed by a host connected to a different network switch, the data transfer between the host and the controller includes a path connecting the two switches. Typically, unlike connections within the same switch, a network connecting switches shares bands with communications using other hosts and other controllers. Thus, access from each host can use only narrow bands, leading to a stronger need for a reduction in the amount of data transfer.

In other words, a storage system using the above-described architecture has had a challenge for minimization of the amount of data transfer for connections including a network with the narrowest band, including the connection between the host and the controller.

In view of the above-described circumstances, an object of the present invention is to propose a storage system in which a network is used to connect a node with a controller function processing access requests and a node storing a storage medium, the storage system mitigating a possible performance bottleneck associated with insufficient network bands to allow improvement of access performance of the storage system, and to also propose a controller assignment method.

To accomplish the object, an aspect of the present invention provides a storage system including a first node with a storage medium of storage and a plurality of second nodes each with a controller function for the storage, the storage system being communicatively connected to a host providing an access request to the storage, in which one of the plurality of second nodes is determined to be a node to which a controller function executing access processing on the storage is assigned on a basis of a first amount of data transfer between the second node and the host and a second amount of data transfer between the second node and the first node.

Additionally, to accomplish the object, an aspect of the present invention provides a controller assignment method for a storage system including a first node with a storage medium of storage and a plurality of second nodes each with a controller function the storage, the storage system being communicatively connected to a host providing an access request to the storage, the controller assignment method including determining a node to which a controller function executing access processing on the storage is assigned on a basis of a first amount of data transfer between the second node and the host and a second amount of data transfer between the second node and the first node.

According to an aspect of the present invention, a possible performance bottleneck associated with insufficient network bands is mitigated to allow improvement of access performance of the storage system.

Note that objects, configurations, and effects other than those described above will be clear from description of embodiments below.

BRIEF DESCRIPTION OF THE DRAWINGS

FIG. 10 is a flowchart illustrating a processing procedure example of controller assignment processing according to the second embodiment.

DESCRIPTION OF THE PREFERRED EMBODIMENTS

Embodiments of the present invention will be described below on the basis of the drawings.

(1) First Embodiment

In a first embodiment of the present invention, an example of a storage system will be described. In the example, an assignment destination node to which a controller function executing access processing is assigned is determined and controlled on the basis of the amount of data transfer between a node with the controller function and a host (amount of to-and-from-host data transfer) and the amount of data transfer between the node with the controller function and a node with a storage medium (amount of to-and-from-storage-medium-node data transfer). The node to which the controller function executing access processing is assigned corresponds to a controller with an ownership for the access processing (owner controller). Note that the present embodiment is not intended to limit the scope of the present invention and that not all elements described in the present embodiment are needed to accomplish the object of the present invention.

Figure 1:
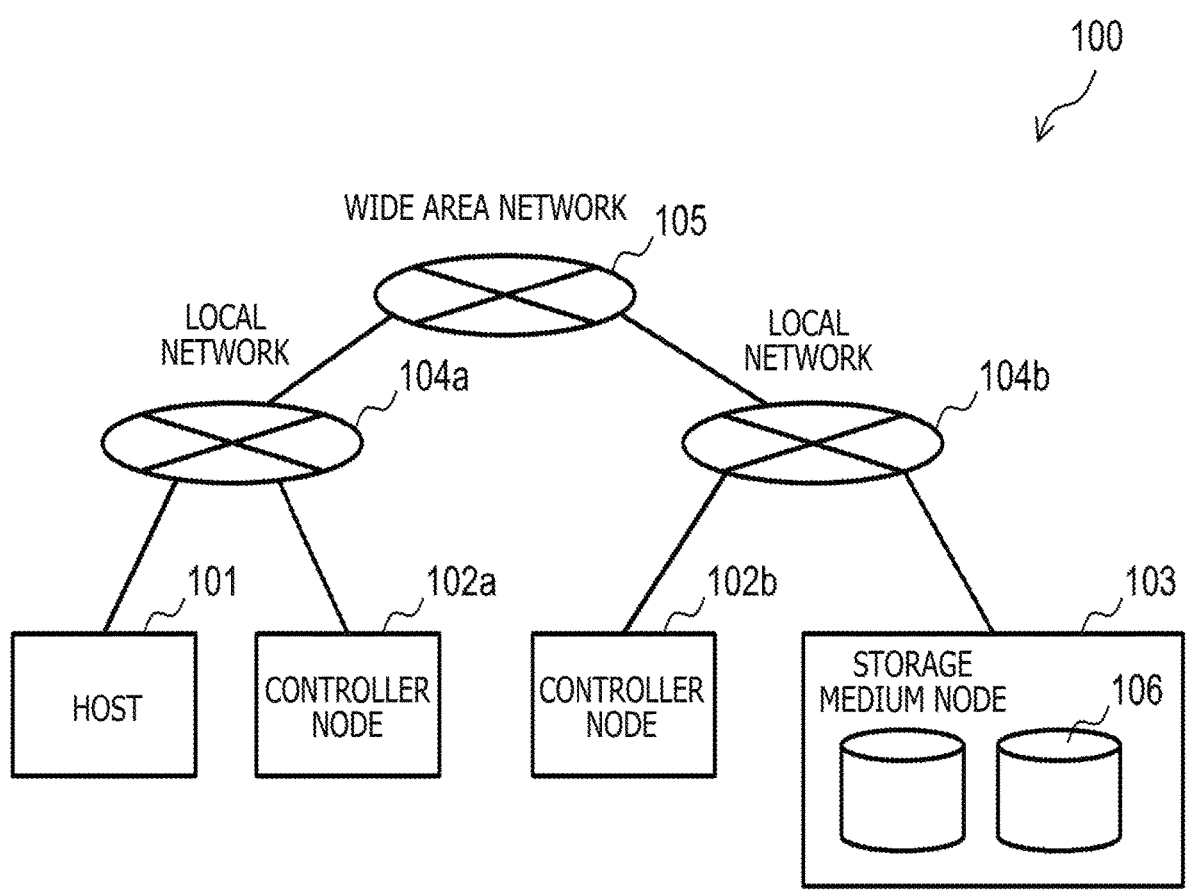
FIG. 1 is a diagram illustrating a configuration example of nodes in a storage system according to a first embodiment.

FIG. 1 is a diagram illustrating a configuration example of nodes in a computer system including a storage system according to the first embodiment.

The computer system illustrated in FIG. 1 includes a host 101, a plurality of controller nodes 102 (individually designated as 102a and 102b), one or more storage medium nodes 103, local networks 104 (individually designated as 104a and 104b) connecting the nodes together, and a wide area network 105 connecting the local networks. In the computer system, a storage system 100 according to the first embodiment includes at least a plurality of controller nodes 102 and one or more storage medium nodes 103.

The host 101 make an access request for access to a storage area to the controller nodes 102a and 102b included in the storage system.

The controller nodes 102 (102a and 102b) are nodes with the controller function for the storage. The controller function includes a controller function executing access processing in response to an access request for access to a storage area. In a case where the host 101 makes an access request for access to a certain storage area, the controller node 102 (owner controller) with the controller function executing access processing on the storage area provides the host 101 with access to the storage area. The storage area is provided to the host 101 in form of, for example, a logical unit (LU) mapped to a memory area of a storage medium 106 stored in the storage medium node 103. Note that the controller node 102 may provide a plurality of LUs to the host 101. Additionally, access to each LU is provided by only one of the controller nodes 102 (that is, the controller node 102a or the controller node 102b).

The storage medium node 103 includes the storage medium 106 to which the memory area of the LU is mapped, and provides access to the controller nodes 102a and 102b. The controller nodes 102a and 102b share the storage medium 106 of the storage medium node 103, and can both access the respective storage media 106.

The local networks 104 (104a and 104b) include wide bands compared to the wide area network 105. In other words, in a case where data is transferred between the node (the host 101 or the controller node 102a) connected to the local network 104a and the node (the controller node 102b or the storage medium node 103) connected to the local network 104b, the wide area network 105 is a network path with the narrowest band.

The relationship between the networks is illustrated. The local networks 104 correspond to networks including switches (SW) for connecting nodes in a server rack, and the wide area network 105 corresponds to a network for connecting SWs in racks. In other words, the local networks 104a and 104b correspond to paths through which nodes connected to the same SW communicate with each other, and are insusceptible to the adverse effect, on available bandwidth, of data transfer between other nodes. On the other hand, the wide area network 105 corresponds to a path used in a case where communication goes beyond the SW for each rack and through which nodes in different racks communicate with one another, and is susceptible to the adverse effect, on available bandwidth, of data transfer between other nodes.

Note that, like the plurality of controller nodes 102a and 102b illustrated in FIG. 1, a plurality of the hosts 101 and a plurality of the storage medium nodes 103 may be present. Additionally, in another configuration example of the storage system 100, the controller node 102a and the host 101 correspond to the same node or the controller node 102b and the storage medium node 103 correspond to the same node. Additionally, the storage medium node 103 may provide simultaneous access to a plurality of the storage media 106. In addition, the configurations (the number of networks, the connection relationship, and the like) of the local network 104 and the wide area network 105 in the storage system. 100 are not limited to the configurations illustrated in FIG. 1.

Figure 2:
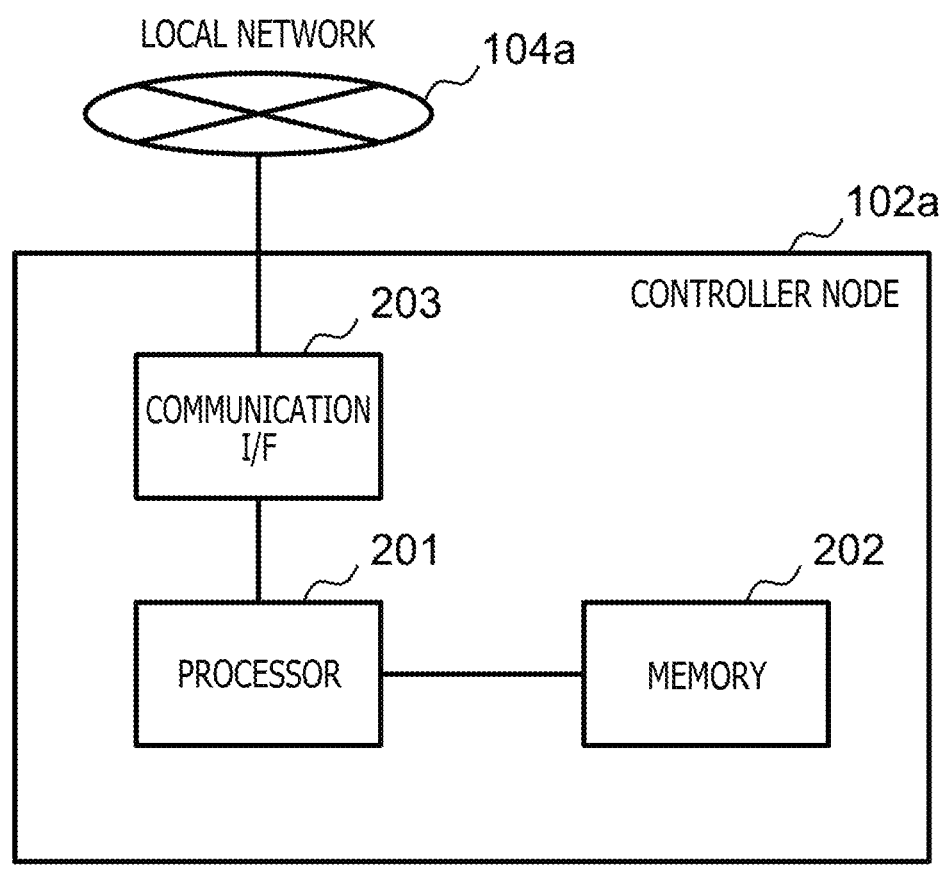
FIG. 2 is a diagram illustrating a configuration example of hardware of a controller node according to the first embodiment.

FIG. 2 is a diagram illustrating a configuration example of hardware of a controller node according to the first embodiment. FIG. 2 illustrates a configuration example of hardware of the controller node 102a illustrated in FIG. 1. However, the controller node 102b may be assumed to have a similar configuration.

As illustrated in FIG. 2, the controller node 102a includes one or more processors 201, one or more memories 202, and one or more communication I/Fs 203.

The processor 201 executes a program using the memory 202 to implement the controller function, providing the host 101 with access to an LU. The communication I/F 203 is connected to the local network 104a to receive, from the host 101, an access request for access to an LU, transmit a response, and transfer, to and from the host 101, Read/Write data associated with processing of the access request. Additionally, the communication I/F 203 transmits an access request for access to the storage medium 106 stored in the storage medium node 103, receives a response, and perform data transfer to and from the storage medium node 103, which is associated with processing of an access request from the host 101.

Note that communication standards for connection between the communication I/F 203 and the local network 104a are not particularly limited as long as the access request, the transmission and reception of a response, and the data transfer as described above are enabled. Likewise, no limitation is imposed on a protocol used in processing (access request, response, and data transmission and reception) executed between the controller node 102a and the host 101 and the storage medium node 103.

Figure 3:
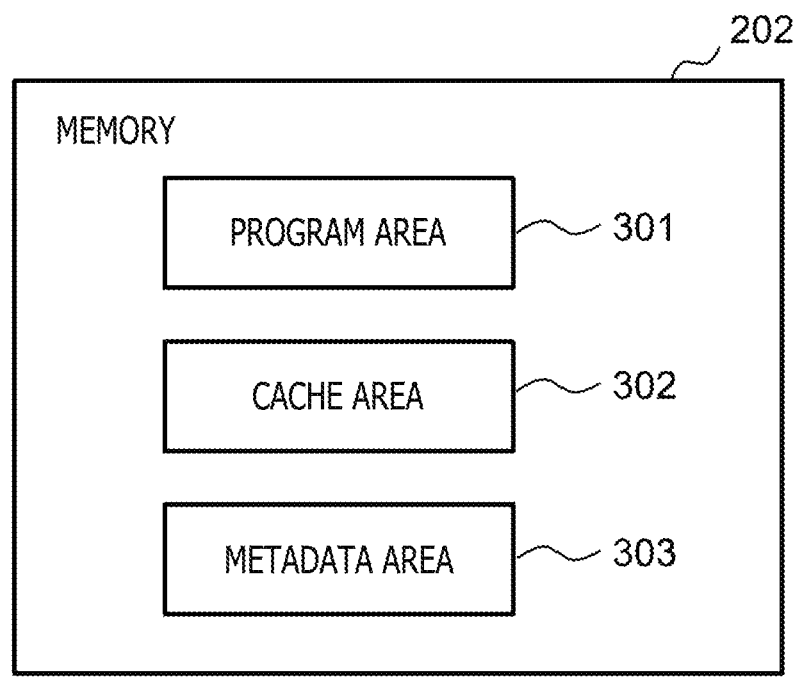
FIG. 3 is a diagram illustrating a configuration example of a data storage area of a memory according to the first embodiment

FIG. 3 is a diagram illustrating a configuration example of data storage areas in the memory according to the first embodiment. As illustrated in FIG. 3, the memory 202 of the controller node 102a (which may be replaced with 102b) includes a program area 301, a cache area 302, and a metadata area 303 as data storage areas corresponding to types.

The program area 301 stores various programs for implementing the controller function of the storage system 100, and the stored programs are executed by the processor 201.

The cache area 302 temporarily stores data read from the storage medium 106 of the storage medium node 103 or Write data for the storage medium 106.

The metadata area 303 stores management information associated with processing of each LU for which the controller node 102a provides access to the host 101.

Figure 4:
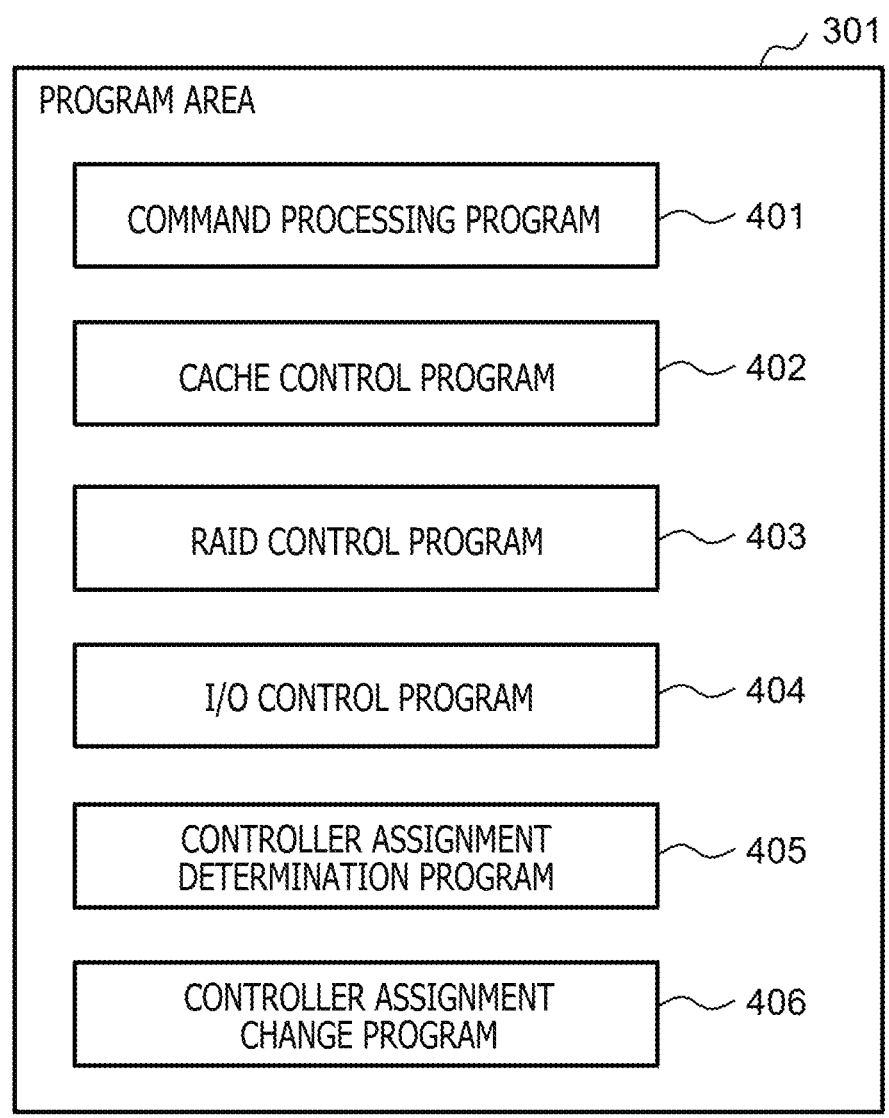
FIG. 4 is a diagram illustrating a configuration example of a program area according to the first embodiment.

FIG. 4 is a diagram illustrating a configuration example of the program area according to the first embodiment. As illustrated in FIG. 4, in the program area 301, the following are stored as the various programs executed by the processor 201: a command processing program 401, a cache control program 402, a redundant array of independent disks (RAID) control program 403, an I/O control program 404, a controller assignment determination program 405, and a controller assignment change program 406.

The command processing program 401 receives, from the host 101, a Read/Write request to an LU and responds with a result, via the communication I/F 203. Additionally, the command processing program 401 starts processing corresponding to the above-described Read/Write request and performs data transfer corresponding to the Read/Write request to and from the host 101 via the communication I/F 203.

The cache control program 402 reserves a portion of the cache area 302 in which data corresponding to the address of an access requesting side is stored, and performs Read/Write of the stored data.

The RAID control program 403 uses memory areas in a plurality of storage media 106 included in the storage medium node 103 to provide a virtual volume with consecutive memory areas. Additionally, in a case where the virtual volume provided has redundancy among the plurality of storage media 106, the RAID control program 403 generate redundant data such as parities for the stored data.

The I/O control program 404 executes a Read/Write request via the communication I/F 203 to the plurality of storage media 106 included in the storage medium node 103. A protocol used for access from the I/O control program 404 to the storage medium 106 is not particularly limited as long as Read/Write access to a specified address is enabled.

The controller assignment determination program 405 determines one of the plurality of controller nodes 102a and 102b to provide access to each LU on the basis of the amount of data transfer between the controller node 102 and the host 101 (amount of to-and-from-host data transfer) and the amount of data transfer between the controller node 102 and the storage medium node 103 (amount of to-and-from-storage-medium-node data transfer). As described below in detail with reference to FIG. 8, the controller assignment determination program 405 compares, in access processing for each LU, the amount of to-and-from-host data transfer with the amount of to-and-from-storage-medium-node data transfer to determine one of the plurality of controller nodes 102 to provide access to the LU such that a data transfer path with a large amount of data transfer does not include a network with narrow bands (the wide area network 105). Furthermore, the controller assignment determination program 405 notifies the host 101 of change of node providing access to the LU. Note that the "node providing access to the LU" is synonymous with the "node with the controller function executing access processing on the LU" and the "controller with the ownership for the access processing (owner controller)."

The controller assignment change program 406 changes the node providing access to each LU on the basis of a result determined by the controller assignment determination program 405. In a case where the node providing access to the LU is changed from the subject node (for example, the controller node 102a) to another node (for example, the controller node 102b), the controller assignment change program 406 transfers, to the change destination node (the controller node 102b), management information used for access processing for the LU. In contrast, in a case where the node providing access to the LU is changed to the subject node (for example, the controller node 102a), the controller assignment change program 406 receives, from the change source node (for example, the controller node 102b), the management information used for access processing for the LU.

Figure 5:
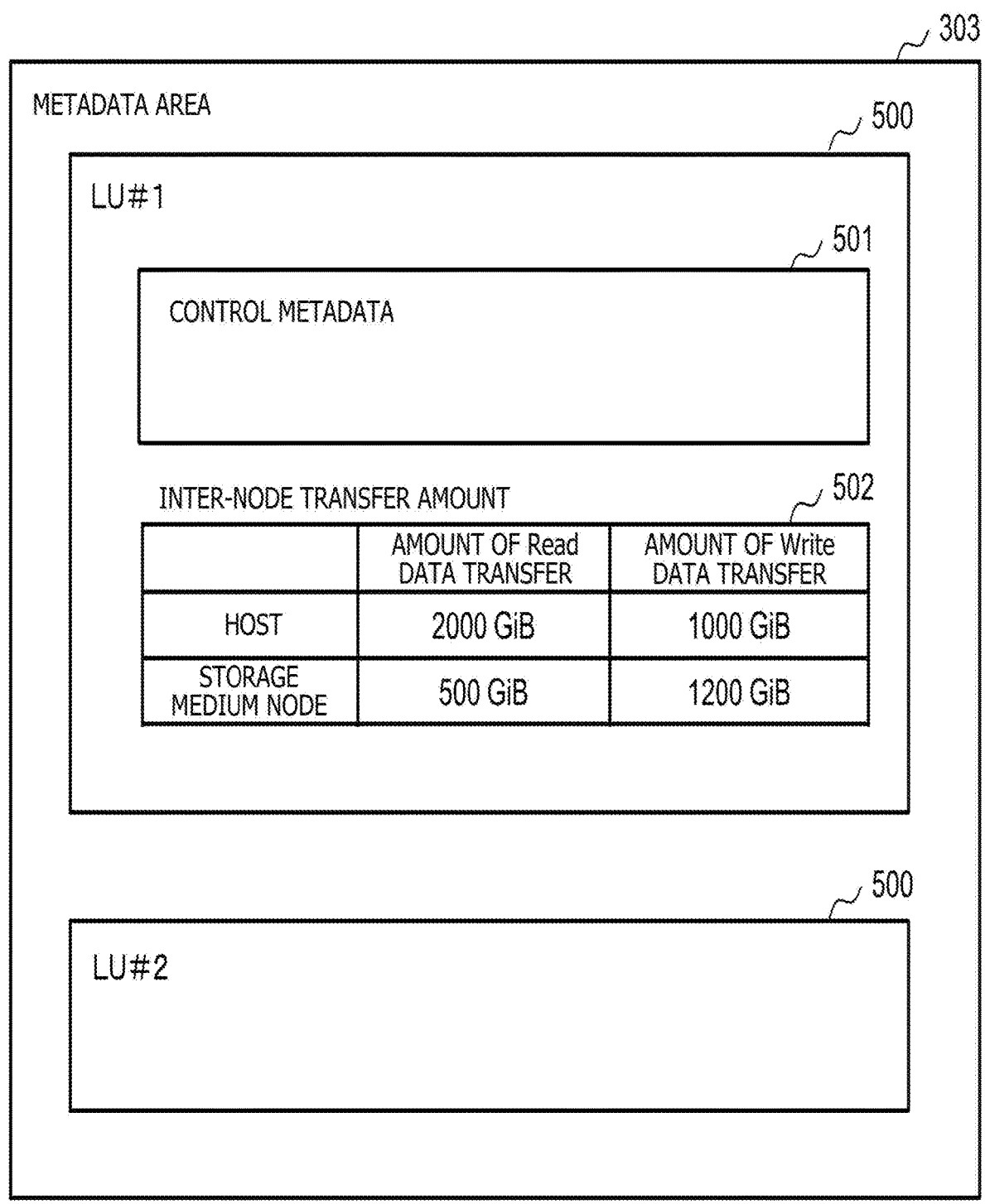
FIG. 5 is a diagram illustrating a configuration example of a metadata area according to the first embodiment.

FIG. 5 is a diagram illustrating a configuration example of the metadata area according to the first embodiment. As illustrated in FIG. 5, management information 500 required for processing for each LU is stored in the metadata area 303 for the LU. The management information 500 includes control metadata 501 related to each LU providing access and an inter-node transfer amount 502 representing the amount of data transfer between the node in which the metadata area 303 operates (the controller node 102) and the host 101 or the storage medium node 103.

The control metadata 501 is control information required to process an access request, from the host 101, for access to each LU. Specifically, for example, the control metadata 501 includes information representing a correspondence relationship between the address of each LU and the memory area of a virtual volume provided by the RAID control program 403.

The following are recorded in the inter-node transfer amount 502: the amount of data transfer involving data that the node in which the metadata area 303 operates (the controller node 102) reads from the other nodes (the host 101 and the storage medium node 103) (amount of Read data transfer) and the amount of data transfer involving data that the other nodes write to the controller node 102 (amount of Write data transfer). With the inter-node transfer amount 502 illustrated in FIG. 9, the amount of data transfer between the controller node 102 and the host 101 (amount of to-and-from-host data transfer) is recorded in the first row of record, and the amount of data transfer between the controller node 102 and the storage medium node 103 is recorded in the second row of record. Note that, for each of the amounts of data transfer recorded in the inter-node transfer amount 502, each time transfer of Read data or Write data to or from the corresponding node takes place, the corresponding amount of data transfer is added.

Note that each amount of data transfer recorded in the inter-node transfer amount 502 may be periodically reset or refreshed or may be subjected to predetermined processing corresponding to the passage of time such as division of the amount in predetermined units of time for recording.

Additionally, in the inter-node transfer amount 502 in FIG. 5, the amount of Read data transfer and the amount of Write data transfer are separately recorded. However, in a case where the controller node 102 uses the total of the amount of Read data transfer and the amount of Write data transfer in processing of comparing the inter-node transfer amounts with each other (see step S802 in FIG. 8 described below), a total value may be pre-calculated and recorded in the inter-node transfer amount 502.

Figure 6:
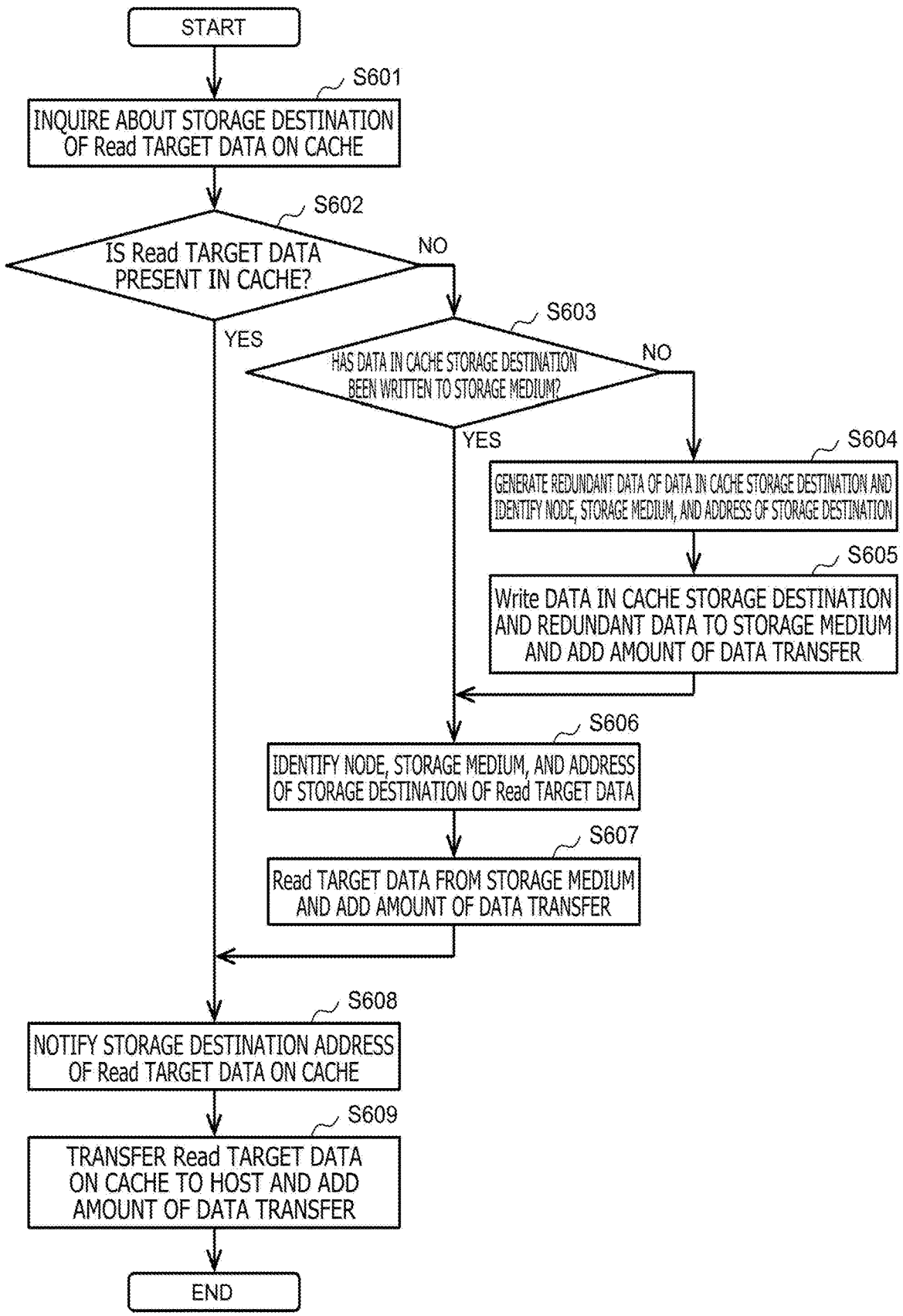
FIG. 6 is a flowchart illustrating a processing procedure example of Read processing according to the first embodiment.

FIG. 6 is a flowchart illustrating a processing procedure example of Read processing according to the first embodiment. The Read processing illustrated in FIG. 6 is executed by the controller node 102 in response to a Read request to an LU from the host 101, and the processor 201 executes each of the programs stored in the program area 301 of the memory 202 as follows.

As illustrated in FIG. 6, first, when receiving LU Read request from the host 101, the command processing program 401 inquires of the cache control program 402 as to a storage destination of the Read target data in the cache area 302 (step S601).

Then, the cache control program 402, having received the inquiry in step S601, determines whether or not Read target data is present in the cache area 302 (step S602). In a case where Read target data is present in the cache area 302, the cache control program 402 executes processing in step S608. In a case where Read target data is not present in the cache area 302, the cache control program 402 executes processing in step S603.

In step S603, the cache control program 402 uses any method to select a storage destination area for the Read target data from the cache area 302, and determines whether or not data already stored in the selected storage destination area (cache data) is already stored in the corresponding memory area in the storage medium 106. In a case where the cache control program 402 determines, on the basis of the determination in step S603, that the data in the selected storage destination area is already stored in the corresponding memory area in the storage medium 106, the cache control program 402 executes processing in step S606. In a case where the cache control program 402 determines that the data in the selected storage destination area is not stored in the corresponding memory area in the storage medium 106 yet, the cache control program 402 executes processing in step S604.

In step S604, the cache control program 402 generates, through the RAID control program 403, redundant data for the data stored in the storage destination area selected in step S603 (original data), and identifies the corresponding storage medium node 103, storage medium 106, and address for the original data and the redundant data, and proceeds to processing in step S605.

In step S605, the cache control program 402 writes the data stored in the storage destination area selected in step S603 (original data) and the redundant data generated in step S604, to the address in the storage medium 106 identified in step S605 (Write). Furthermore, the cache control program 402 uses the total value of the size of the original data on the cache and the size of the redundant data, the original data and the redundant data having been written to the storage medium 106, to update the inter-node transfer amount 502 in the management information 500 corresponding to the LU storing the original data and the redundant data. Specifically, the cache control program 402 adds the total value to the amount of Write data transfer in the amount of to-and-from-storage-medium-node data transfer in the corresponding inter-node transfer amount 502. Then, when the processing in step S605 is ended, the cache control program 402 proceeds to the processing in step S606.

In step S606, the cache control program 402 identifies, through the RAID control program 403, the corresponding storage medium node 103, the storage medium 106, and address for the Read target data as to which the inquiry has been received from the command processing program 401 in step S601, and proceeds to processing in step S607.

In step S607, the cache control program. 402 performs Read on the address in the storage medium 106 identified in step S606, and stores Read result data in the storage destination area selected in step S603. Furthermore, the cache control program 402 uses the size of the data read from the storage medium 106 to update the inter-node transfer amount 502 in the management information 500 corresponding to the LU storing the data. Specifically, the cache control program 402 adds the size of the read data to the amount of Read data transfer in the amount of to-and-from-storage-medium-node data transfer in the corresponding inter-node transfer amount 502. Then, when the processing in step S607 is ended, the cache control program 402 proceeds to the processing in step S608.

In step S608, on the basis of the processing result in step S602 (in a case where the determination result is YES) or the processing result in step S607, the cache control program 402 notifies the command processing program 401 of the storage destination address, in the cache area 302, of the Read target data as to which the inquiry has been received in step S601.

Then, the command processing program 401 transfers the Read target data stored at the address notified in step S608, to the host 101 via the communication I/F 203 as the result of the Read request. Furthermore, the command processing program 401 uses the size of the Read data transferred to the host 101, to update the inter-node transfer amount 502 in the management information 500 corresponding to the LU storing the Read data. Specifically, the command processing program 401 adds the size of the Read data to the amount of Read data transfer in the amount of to-and-from-host data transfer in the corresponding inter-node transfer amount 502 (step S609). Then, the processing in step S609 is completed to end the series of steps of Read processing.

In the storage system 100, in a case where unwritten data is present that is driven out from the cache area 302 when the host 101 makes a Read request to the LU, the above-described series of steps of Read processing is executed to allow the data to be sent to the storage medium 106 and to allow the Read target data to be transferred from the cache area 302 to host 101.

Figure 7:
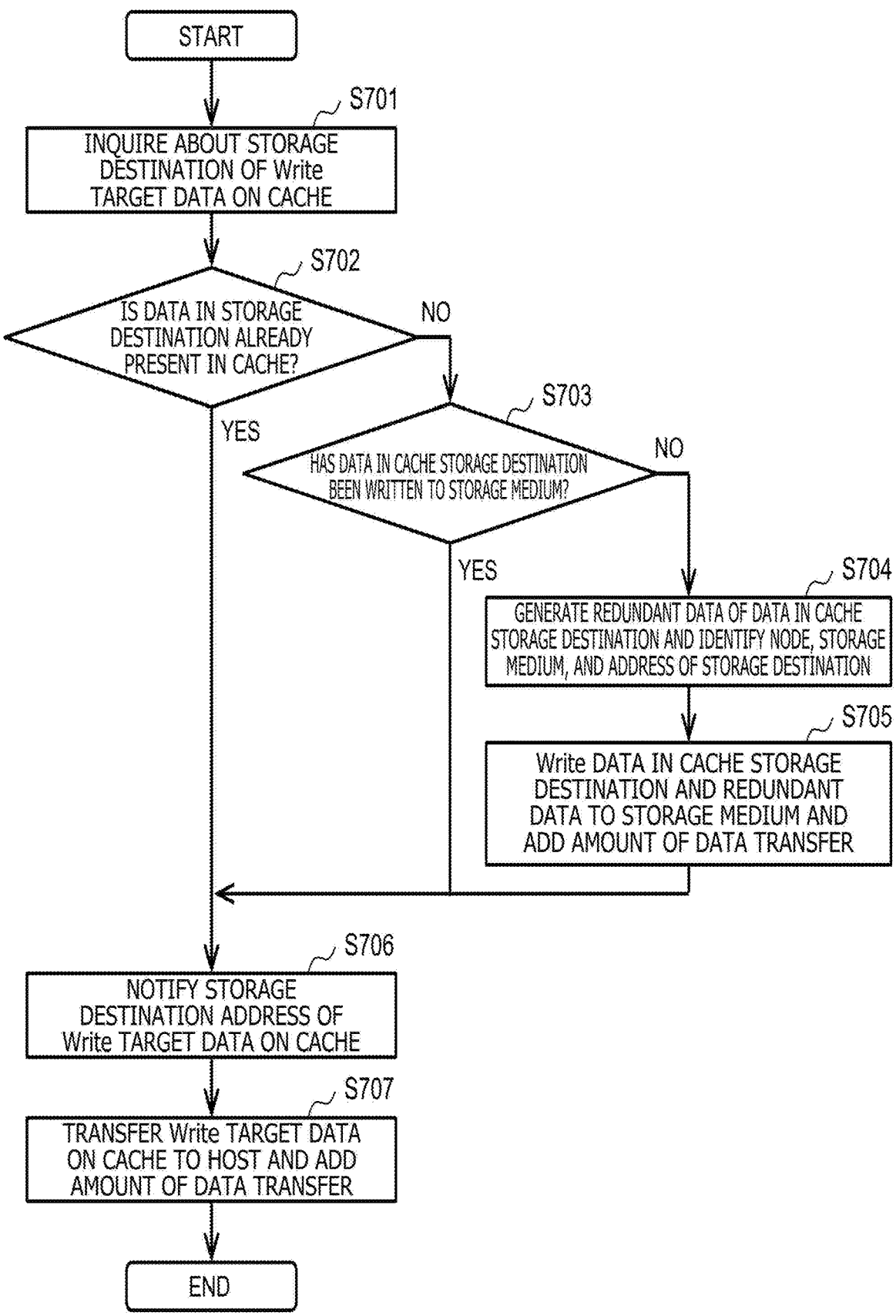
FIG. 7 is a flowchart illustrating a processing procedure example of Write processing according to the first embodiment.

FIG. 7 is a flowchart illustrating a processing procedure example of Write processing according to the first embodiment. The Write processing illustrated in FIG. 7 is executed by the controller node 102 in response to a Write request to an LU from the host 101, and the processor 201 executes each of the programs stored in the program area 301 of the memory 202 as follows.

As illustrated in FIG. 7, first, when receiving the LU Write request from the host 101, the command processing program 401 inquires of the cache control program 402 as to the storage destination, in the cache area 302, of Write target data (step S701).

Then, the cache control program 402, having received the inquiry in step S701, determines whether or not data stored at a Write destination address is present in the cache area 302 (step S702). In a case where Write target data is present in the cache area 302, the cache control program 402 executes processing in step S706. In a case where Write target data is not present in the cache area 302, the cache control program 402 executes processing in step S703.

In step S703, the cache control program 402 uses any method to select a storage destination area for the Read target data from the cache area 302, and determines whether or not data already stored in the selected storage destination area (cache data) is already stored in the corresponding memory area in the storage medium 106. In a case where the cache control program. 402 determines, on the basis of the determination in step S703, that the data in the selected storage destination area is already stored in the corresponding memory area in the storage medium 106, the cache control program 402 executes processing in step S706. In a case where the cache control program 402 determines that the data in the selected storage destination area is not stored in the corresponding memory area in the storage medium 106 yet, the cache control program 402 executes processing in step S704.

In step S704, the cache control program 402 generates, through the RAID control program 403, redundant data for the data stored in the storage destination area selected in step S703 (original data), and identifies the corresponding storage medium node 103, storage medium 106, and address for the original data and the redundant data, and proceeds to processing in step S705.

In step S705, the cache control program 402 writes the data stored in the storage destination area selected in step S703 (original data) and the redundant data generated in step S704, to the address in the storage medium 106 identified in step S705 (Write). Furthermore, the cache control program 402 uses the total value of the size of the original data on the cache and the size of the redundant data, the original data and the redundant data having been written to the storage medium 106, to update the inter-node transfer amount 502 in the management information 500 corresponding to the LU storing the original data and the redundant data. Specifically, the cache control program 402 adds the total value to the amount of Write data transfer in the amount of to-and-from-storage-medium-node data transfer in the corresponding inter-node transfer amount 502. Then, when the processing in step S705 is ended, the cache control program 402 proceeds to the processing in step S706.

In step S706, on the basis of the processing result in step S702 (in a case where the determination result is YES) or the processing result in step S705, the cache control program 402 notifies the command processing program 401 of the storage destination address, in the cache area 302, of the Write target data as to which the inquiry has been received in step S701.

Then, the command processing program 401 receives the Write target data from the host 101 via the communication I/F 203, and stores the Write target address at the address notified in step S706. Furthermore, the command processing program 401 uses the size of the Write data transferred from the host 101, to update the inter-node transfer amount 502 in the management information 500 corresponding to the LU storing the Write data. Specifically, the command processing program 401 adds the size of the Write data to the amount of Write data transfer in the amount of to-and-from-host data transfer in the corresponding inter-node transfer amount 502 (step S707). Then, the processing in step S707 is completed to end the series of steps of Write processing.

In the storage system 100, in a case where unwritten data is present that is driven out from the cache area 302 when the host 101 makes a Write request to the LU, the above-described series of steps of Write processing is executed to allow the data to be sent to the storage medium 106 and to allow the Write target data to be written to the cache area 302.

Figure 8:
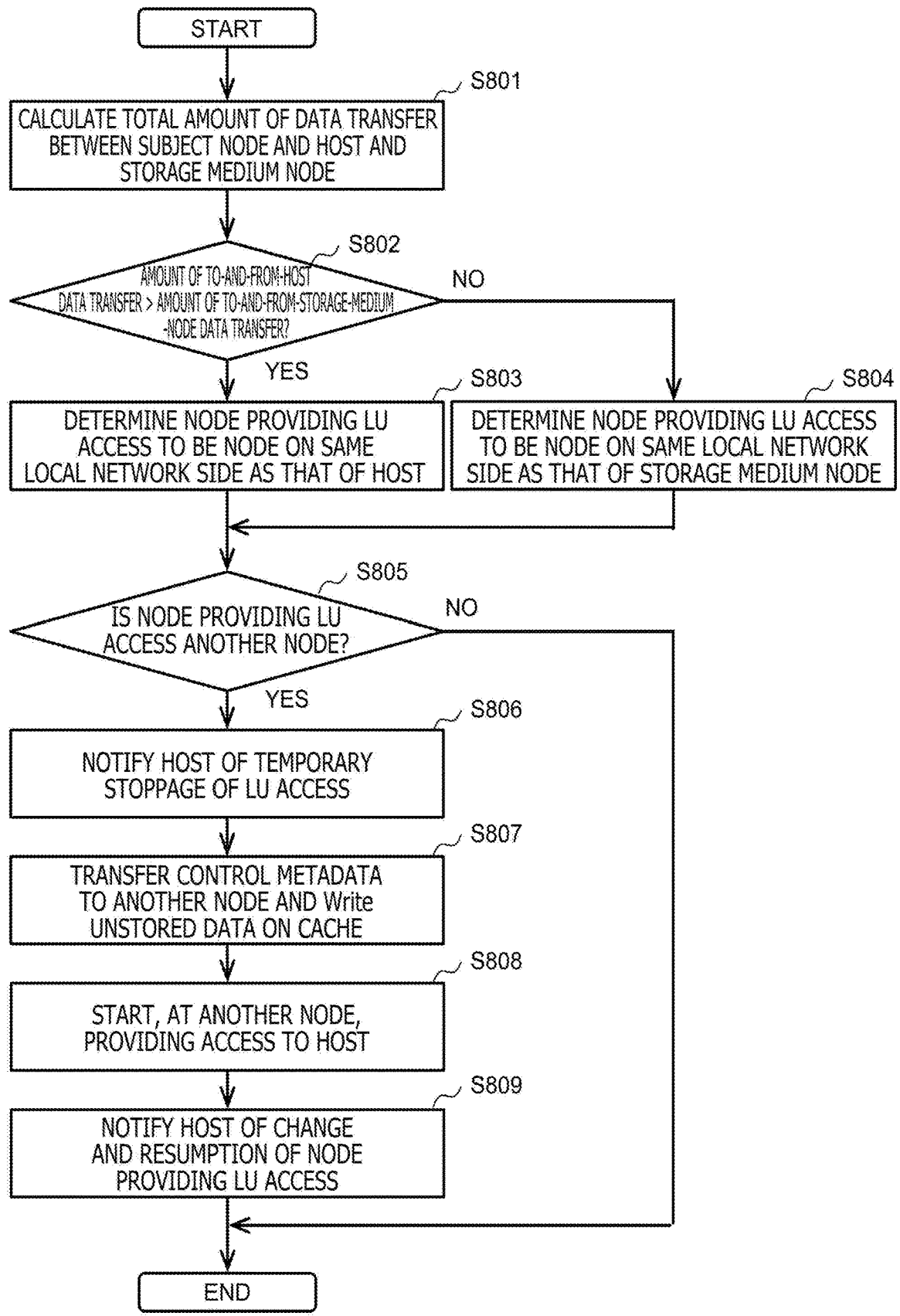
FIG. 8 is a flowchart illustrating a processing procedure example of controller assignment processing according to the first embodiment.

FIG. 8 is a flowchart illustrating a processing procedure example of controller assignment processing according to the first embodiment. The controller assignment processing illustrated in FIG. 8 involves determining and changing controller assignment for each LU providing access. The processing is started by the controller node 102a or 102b starting to execute the controller assignment determination program 405 with an optional period.

When the controller assignment processing is started, first, the controller assignment determination program 405 references the inter-node transfer amount 502 in the management information 500 corresponding to the LU for which the controller assignment is to be determined, and computes the total amount of data transfer for each of the amount of data transfer between the subject node and the host 101 (amount of to-and-from-host data transfer) and the amount of data transfer between the subject node and the storage medium node 103 (amount of to-and-from-storage-medium-node data transfer) (step S801). Each total amount of data transfer is computed by adding the amount of Read data transfer and the amount of Write data transfer in the corresponding inter-node transfer amount. Note that the subject node corresponds to the node executing the controller assignment determination program 405, that is, the controller node 102a or the controller node 102b.

Then, the controller assignment determination program 405 compares the two total amounts of data transfer calculated in step S801 (step S802). Then, in a case where the total amount of data transfer for the inter-node transfer amount is larger than the total amount of data transfer for the amount of to-and-from-storage-medium-node data transfer (YES in step S802), the controller assignment determination program 405 executes processing in step S803. In a case where the total amount of data transfer for the inter-node transfer amount is equal to or smaller than the total amount of data transfer for the amount of to-and-from-storage-medium-node data transfer (NO in step S802), the controller assignment determination program 405 executes processing in step S804.

In step S803, for the LU for which the controller assignment is to be determined, the controller assignment determination program 405 determines the controller node 102a connected to the same local network 104a to which the host 101 is connected to be the node providing access to the LU, and proceeds to processing in step S805.

On the other hand, in step S804, for the LU for which the controller assignment is to be determined, the controller assignment determination program 405 determines the controller node 102b connected to the same local network 104b to which the storage medium node 103 is connected to be the node providing access to the LU, and proceeds to processing in step S805.

In step S805, the controller assignment determination program 405 determines whether or not the node determined in step S803 or step S804 (the node providing access to the LU) matches the subject node (the node executing the controller assignment determination program 405). In step S805, in a case where the two nodes do not match, that is, in a case where the node providing access to the LU is changed from the subject node to another node (YES in step S805), the controller assignment determination program 405 proceeds to processing in step S605. On the other hand, in a case where the two nodes match, that is, in a case where the node providing access to the LU remains the subject node (NO in step S805), the controller assignment processing is ended.

In step s806, the controller assignment change program 406 notifies the host 101 of temporary access stoppage related to the LU for which the controller assignment is changed (that is, the LU for which the node providing access is to be changed by the processing in step S803 or step S804).

Then, the controller assignment change program 406 transfers the control metadata 501 held by the subject node (for example, the controller node 102a) and related to the LU for which the controller assignment is to be changed, to "another node (for example, the controller node 102b)." Additionally, through the cache control program 402, the controller assignment change program 406 writes, to the storage medium 106, all of the data in the cache area 302 of the subject node (for example, the controller node 102a) that is not stored in the storage medium 106 (step S807).

Then, the controller assignment change program 406 instructs another node to which the control metadata 501 is transferred in step S807, in other words, the controller assignment change destination node (for example, the controller node 102b) to start providing access to the LU. In response to the instruction, the controller assignment change program 406 operating in the change destination node starts providing access to the LU and subsequently notifies the controller assignment change source node (for example, the controller node 102a) that the start of access provision is completed (step S808).

Then, the controller assignment change program 406 in the change source node (for example, the controller node 102a) notified that the start of access provision is completed in step S808 notifies the host 101 of change of the access destination node and resumption of access related to the LU for which temporary stoppage of access is notified in step S806 (step S809). Then, the processing in step S809 is completed to end the series of steps of controller assignment processing.

Note that, instead of being provided from the change source node to the host 101, the notification, in step S809, of change of the access destination node and resumption of access related to the LU may be provided from the change destination node to the host 101. Furthermore, in this case, the notification of completion of access provision start provided from the change destination node to the change source node in step S808 may be omitted.

Additionally, in steps S801 and S802 described above, for the amount of to-and-from-host data transfer and the amount of to-and-from-storage-medium-node data transfer, the total amounts of data transfer are calculated by adding the amount of Read data transfer and the amount of Write data transfer together and are used to compare the amount of to-and-from-host data transfer with the amount of to-and-from-storage-medium-node data transfer. However, the controller assignment processing according to the present embodiment is not limited to the comparison method. Another comparison method may, for example, individually use the amount of Read data transfer and the amount of Write data transfer for comparison or use only one of the amount of Read data transfer or the amount of Write data transfer for comparison. Additionally, instead of the simple total values of the amount of Read data transfer and the amount of Write data transfer, for example, the total values of the amounts of data transfer may be used that are computed by weighting Read/Write according to application or configuration for comparison.

Execution of the above-described series of steps of controller assignment processing allows the storage system 100 according to the first embodiment to determine one of the controller nodes 102a and 102b to be the assignment destination of the node with the controller function executing the access processing (owner controller) and to change the assignment destination, on the basis of the amount of to-and-from-host data transfer between the node with the controller function and the host 101 and the amount of to-and-from-storage-medium-node data transfer between the node with the controller function and the node with the storage medium 106 (the storage medium node 103).

The controller assignment processing involves comparing the amount of to-and-from-host data transfer with the amount of to-and-from-storage-medium-node data transfer to determine the assignment destination of the controller function executing the access processing such that the data transfer path with a larger amount of data transfer does not include a network with narrow bands available (the wide area network 105).

In a specific case, for example, an LU with a high cache hit rate has a reduced frequency of access to the storage medium 106, leading to an increase in amount of data transfer to and from the host 101 relative to the amount of data transfer to and from the storage medium node 103. In other words, the amount of to-and-from-host data transfer is larger than the amount of to-and-from-storage-medium-node data transfer. In this case, the controller assignment processing determines the controller node 102a, connected to the same local network 104a to which the host 101 is connected, to be the assignment destination of the controller function executing the access processing (step S803). The controller node 102a provides access to the LU, and the wide area network 105 with narrow bands is used as a data transfer path of transfer to and from the storage medium node 103. This enables bottlenecks to be mitigated.

Additionally, for example, in contrast to the above-described case, an LU with a low cache hit rate and many data writes has an increased amount of data transfer to and from the storage medium 106 due to storage of redundant data in RAID compared to data read and written by the host 101. In other words, the amount of to-and-from-storage-medium-node data transfer is larger than the amount of to-and-from-host data transfer. In this case, the controller assignment processing determines the controller node 102b, connected to the same local network 104b to which the storage medium node 103 is connected, to be the assignment destination of the controller function executing the access processing (step S804). The controller node 102b provides access to the LU, and the wide area network 105 with narrow bands is used as a data transfer path of transfer to and from the host 101. This enables bottlenecks to be mitigated.

As described above, the storage system 100 according to the present embodiment determines the assignment destination of the node with the controller function executing the access processing such that, of the two types of inter-node communication centered at the node with the controller function, the network path for the inter-node communication with a larger amount of data transfer does not include a network with the narrowest band available. The assignment destination of the node with the controller function executing the access processing may be determined such that the network path for the inter-node communication with a smaller amount of data transfer includes a network with the narrowest band available. Such controller assignment enables, in the access processing corresponding to an access request for access to the storage system 100 from the host 101, a reduction in the amount of data transfer in the network path with the narrowest band available (for example, the wide area network 105). As a result, a possible performance bottleneck associated with insufficient network bands can be mitigated, allowing the access performance of the storage system to be improved.

(2) Second Embodiment

In a second embodiment of the present invention, an example of a storage system will be described. In the example, an assignment destination node of the controller function executing the access processing is determined and controlled on the basis of the amount of data transfer involved in access to a storage medium associated not only with processing resulting from to an access request from the host but also with internal processing scheduled to be implemented by the node with the controller function. Note that the present embodiment is not intended to limit the scope of the present invention and that not all the elements described in the present embodiment are needed to achieve the object of the present invention. Additionally, the description of the present embodiment focuses on differences from the configurations and the operations in the first embodiment, and components, reference signs, operations, and the like that will not be described below are assumed to be identical to the corresponding components, reference signs, operations, and the like in the first embodiment.

Figure 9:
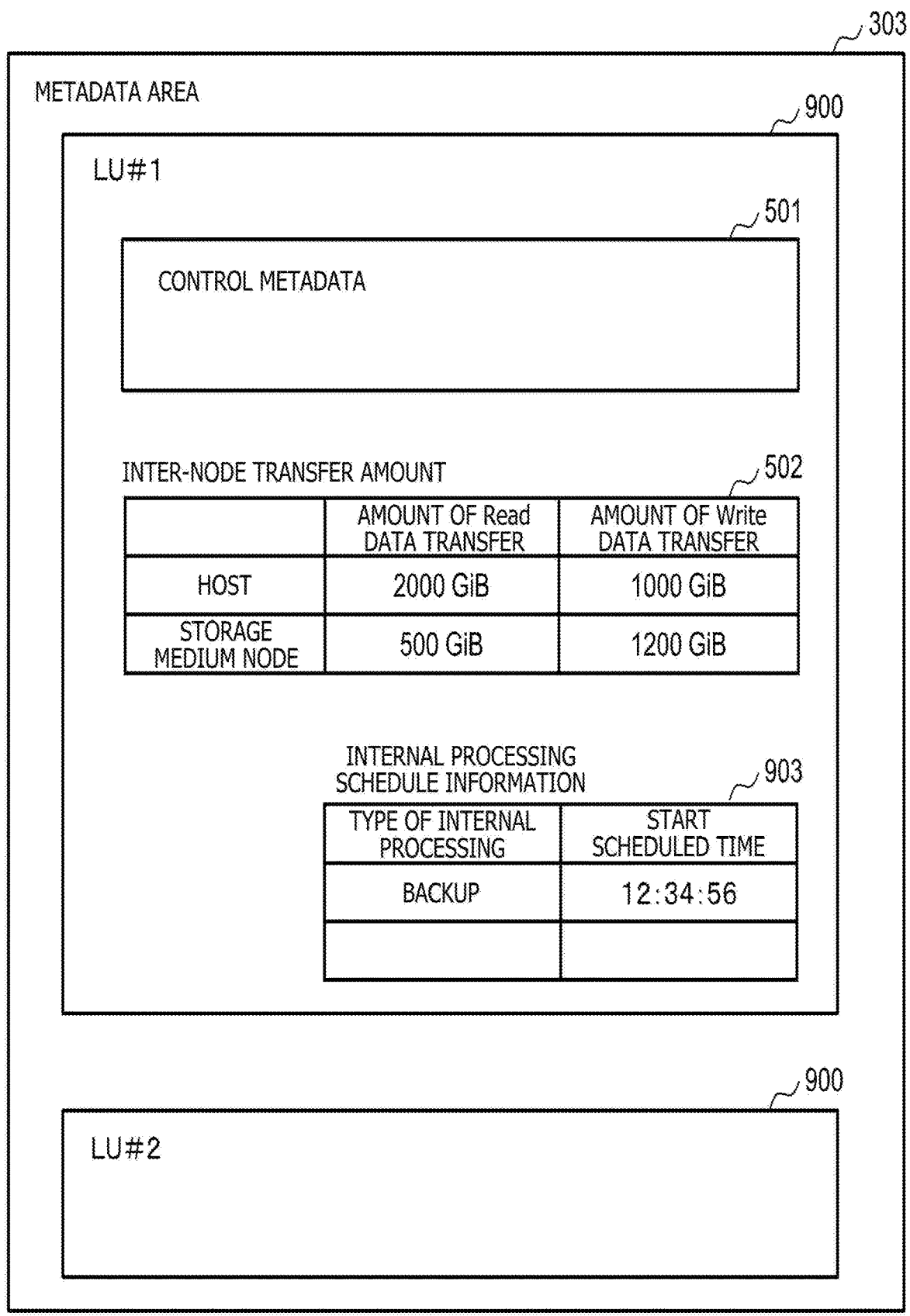
FIG. 9 is a diagram illustrating a configuration example of a metadata area according to the second embodiment.

FIG. 9 is a diagram illustrating a configuration example of the metadata area according to the second embodiment. As illustrated in FIG. 9, in the metadata area 303 in the second embodiment, management information 900 needed for processing for each LU is stored for the LU. In addition to the control metadata 501 and the inter-node transfer amount 502 as described in the first embodiment (see FIG. 5), the management information 900 includes internal processing schedule information 903 for each LU.

The following are recorded in the internal processing schedule information 903, the type of the internal processing for the LU such as backup and data integrity check, and the start scheduled time of the internal processing. In a case where the internal processing includes backup for the LU, predicted Read access to the storage medium 106 in the processing has a capacity obtained by subtracting, from the capacity of the LU, the data size of the LU stored in the cache. Additionally, in a case where a backup destination is the storage medium 106 in the storage medium node 103, Write access of the same capacity as that of the Read is predicted to take place.

FIG. 10 is a flowchart illustrating a processing procedure example of controller assignment processing according to the second embodiment. Like the controller assignment processing according to the first embodiment (see FIG. 8), the controller assignment processing illustrated in FIG. 10 includes determining and changing the controller assignment for each LU for which access is provided and is started by the controller node 102a or 102b starting to execute the controller assignment determination program 405 with an optional period.

When the controller assignment processing is started, first, the controller assignment determination program 405 references the inter-node transfer amount 502 in the management information 900 corresponding to the LU for which the controller assignment is to be determined, and computes the total amount of data transfer for each of the amount of data transfer between the subject node and the host 101 (amount of to-and-from-host data transfer) and the amount of data transfer between the subject node and the storage medium node 103 (amount of to-and-from-storage-medium-node data transfer) (step S801).

Then, the controller assignment determination program 405 references the internal processing schedule information 903 in the management information 900 corresponding to the LU for which the controller assignment is to be determined, and in a case where, in the lapse of the execution period, the internal processing is to take place before the next execution of the controller assignment determination program 405 is started (the internal processing schedule information 903 indicates a start scheduled time prior to the next execution start time), the controller assignment determination program 405 adds the amount of data transfer in access to the storage medium 106 scheduled in the internal processing to the total amount of data transfer for the amount of to-and-from-storage-medium-node data transfer computed in step S801 (step S1001).

In the controller assignment processing in the second embodiment, the processing in step S1001 adds the estimated amount of data communication to the total amount of data transfer for the amount of to-and-from-storage-medium-node data transfer. Then, by using the total amount of data transfer resulting from the addition, the amount of to-and-from-host data transfer is compared with the amount of to-and-from-storage-medium-node data transfer (step S802), and in accordance with a comparison result, the node providing access to the LU is determined (steps S803 and S804). As a result, the first embodiment compares the current values (history) of the amounts of data communication to determine the assignment destination of the controller function executing the access processing, whereas the second embodiment allows the amounts of data communication obtained on the basis of estimation to be compared to determine the assignment destination of the controller function executing the access processing.

Then, in step S805 and subsequent steps, processing needed in response to change of the node providing access to the LU is executed as is the case with the controller assignment processing according to the first embodiment (FIG. 8) (steps S805 to S809). However, in the controller assignment processing in FIG. 10, step S807 in FIG. 8 is replaced with step S1002.

In step S1002, the controller assignment change program 406 transfers, to "another node (for example, the controller node 102b)" providing access to the LU, the control metadata 501 and the internal processing schedule information 903 related to the LU for which the controller assignment is to be changed, the control metadata 501 and the internal processing schedule information 903 being held by the subject node (for example, the controller node 102a). Additionally, through the cache control program 402, the controller assignment change program 406 writes, to the storage medium 106, all of the data in the cache area 302 of the subject node (for example, the controller node 102a) that is not stored in the storage medium 106. Subsequently, the processing in step S808 is executed.

The processing in step S1002 differs from step S807 in FIG. 8 only in that, in addition to the control metadata 501, the internal processing schedule information 903 is transferred from the change source node to the change destination node.

Execution of the above-described series of steps of controller assignment processing allows the storage system 100 according to the second embodiment to determine one of the plurality of controller nodes 102a and 102b to be the assignment destination of the node with the controller function executing the access processing and to change the assignment destination, on the basis of the amount of to-and-from-host data transfer between the node with the controller function and the host 101 and the amount of to-and-from-storage-medium-node data transfer between the node with the controller function and the node with the storage medium 106 (storage medium node 103).

The controller assignment processing according to the second embodiment is similar to the controller assignment processing according to the first embodiment in that the assignment destination node of the controller function executing the access processing is determined on the basis of the result of comparison of the amount of to-and-from-host data transfer and the amount of to-and-from-storage-medium-node data transfer, but allows the amount of data transfer in the network to be estimated more accurately than in the first embodiment by considering the internal processing schedule for the controller node 102a or 102b, for the amount of data transfer to be compared. Then, by accurately estimating the amount of data transfer to determine the assignment destination node of the controller function executing the access processing, a possible performance bottleneck in the storage system 100 associated with insufficient network bands is reliably mitigated, allowing the access performance to be improved.

Note that, in the estimation of the amount of data communication in the controller assignment processing according to the second embodiment (step S1001 in FIG. 10), at least one of the following can be used: the cache hit rate, RAID or Erasure Coding configuration information, a reduction rate for the amount of data transfer based on data compression and decompression, a data duplication rate, the ratio between Read and Write in access, and an access size.

The embodiments of the present invention have been described. However, the present invention is not limited to the above-described embodiments and includes various derivatives. For example, the above-described embodiments have been described in detail to facilitate understanding of the present invention, and are not limited to the embodiments including all of the above-described components.

Additionally, a part of configuration of a certain embodiment can be replaced with the configuration of another embodiment, and to the configuration of a certain embodiment, the configuration of another embodiment can be added. In addition, to a part of configuration of each embodiment, addition, deletion, or replacement of another configuration can be made.

Specifically, for example, the cache area 302, the cache control program 402, and the RAID control program 403 included in the controller nodes 102a and 102b are presented in order to describe a change in the amount of data transfer between the controller node 102 and the host 101 and between the controller node 102 and the storage medium node 103. The storage system according to the present invention need not necessarily include the cache area 302, the cache control program 402, and the RAID control program 403. It is sufficient that, in a configuration to which the present invention is suitably applied, for example, there is a difference in the amount of data communication between the host side and the storage (storage medium 106).

In other words, preferably, in the configuration to which the present invention is applied, for a request for the access processing to the storage (the storage medium 106), the amount of data communication (or the amount of data transfer) between the controller node 102 and the host 101 differs from the amount of data communication (or the amount of data transfer) between the controller node 102 and the storage medium node 103. Additionally, the controller function executing the access processing for the storage includes at least one of a cache function, a data reduction function (compression and decompression or deduplication function), and a redundancy function.

Additionally, for example, in the first and second embodiments, the network is shared by the entirety of the connection between the host 101 and the controller nodes 102a and 102b, corresponding to an external connection of the storage system 100, and the connection between the storage medium node 103 and the controller nodes 102a and 102b, corresponding to an internal connection of the storage system 100. However, the present invention is not limited to such a configuration. For example, the connection of the controller node 102a, the connection between the controller nodes 102b and the host 101, and the connection of the storage medium node 103 may utilize different networks, and the local networks 104 and 104b and the wide area network 105 may be present for each of the connections.

Additionally, for example, in the first and second embodiments, the inter-node transfer amount 502 stored in the metadata area 303 is referenced for the determination, in the controller assignment processing, of the assignment destination of the node provided with the controller function executing the access processing. However, in a case where information similar to the inter-node transfer amount 502 is stored in an optional location in the storage system 100, the information may be used instead of the inter-node transfer amount 502. Specifically, for example, in a case where a computer system including the storage system 100 includes, as a network function, a function recording the amount of transfer in a Read/Write direction, the controller assignment processing may be executed using the information recorded by the function instead of the inter-node transfer amount 502, and in this case, the storage system 100 does not store the inter-node transfer amount 502 in the metadata area 303.

Additionally, for example, in the first and second embodiments, the functions of the controller nodes 102a and 102b are assumed to include software executed in the processor 201. However, some or all of the functions may be implemented by hardware.

In addition, the drawings illustrate control lines and information lines considered to be necessary and do not illustrate all of the control lines and information lines in the product. In implementation, substantially all the components may be assumed to be connected together.

What is claimed is:

1. A storage system comprising:
a first node comprising a storage medium of storage; and
a plurality of second nodes each comprising a controller function for the storage,
the storage system being communicatively connected to a host providing an access request to access the storage, wherein
each of the plurality of second nodes configured to:
receive, from the host, the access request;
determine a first amount of data transfer between a subject second node of the plurality of second nodes and the host;
determine a second amount of data transfer between the subject second node and the first node; and
assign a controller function, for executing processing of the access request, to one of the plurality of second nodes based on a comparison between the first amount of data transfer and the second amount of data transfer, wherein
the host and the first node are connected using a communication area including a low-speed communication area with low data communication performance,
in a case where the second amount of data transfer is increased larger than the first amount of data transfer, the controller function determines an assignment destination of the controller function to be the one of the plurality of second nodes connected to the first node using a high-speed communication area, and
in a case where the second amount of data transfer is reduced smaller than the first amount of data transfer, the controller function determines the assignment destination of the controller function to be the one of the plurality of second nodes connected to the host using a high-speed communication area.

2. The storage system according to claim 1, wherein
the controller function includes at least one of a cache function, a data reduction function, and a redundancy function, and
for the access request, the first amount of data transfer differs from the second amount of data transfer.

3. The storage system according to claim 1, wherein
the first node, the plurality of second nodes, and the host are connected together by a network.

4. The storage system according to claim 1, wherein
connections between the host and the first node and at least one of the second nodes are made with narrower frequency bands than connections between other nodes,
the first amount of data transfer is compared with the second amount of data transfer,
in a case where the first amount of data transfer is larger than the second amount of data transfer, a node with the controller function executing the access processing is determined such that the connection between the host and the determined node does not include the connection with narrower network bands, and
in a case where the second amount of data transfer is larger than the first amount of data transfer, the node with the controller function executing the access processing is determined such that the connection between the host and the determined node includes the connection with narrower network bands.

5. The storage system according to claim 1, wherein
in determination of an assignment destination of the node with the controller function executing the access processing on the storage,
on a basis of a difference of the first amount of data transfer from network bands available between the one of the plurality of second nodes and the host and a difference of the second amount of data transfer from network bands available between the one of the plurality of second nodes and the first node,
the assignment destination of the node with the controller function is determined so to increase a difference of the amount of data transfer from the available network bands.

6. The storage system according to claim 1, wherein
the first amount of data transfer and the second amount of data transfer are actual performance.

7. The storage system according to claim 1, wherein
an amount of data transfer is estimated on a basis of a schedule of internal processing executed by each of the plurality of second nodes through communication with the first node, the data transfer being expected to be performed between each of the plurality of second nodes and the first node for the internal processing until a predetermined future time,
the estimated amount of data transfer is included in the second amount of data transfer, and
on a basis of the first amount of data transfer and the second amount of data transfer, the one of the plurality of second nodes is assigned to be a node to which the controller function executing the access processing.

8. The storage system according to claim 7, wherein
the estimated the amount of data transfer is based on at least one of a cache hit rate, configuration information of Redundant Array of Independent Disks or Erasure Coding, a reduction rate for the amount of transfer based on compression and decompression of data, a data duplication rate, a ratio between Read and Write in access, and an access size.

9. A controller assignment method for a storage system including a first node comprising a storage medium of storage and a plurality of second nodes each comprising a controller function for the storage, the storage system being communicatively connected to a host providing an access request to access the storage, the controller assignment method comprising:
receiving, from the host, the access request;
determining a first amount of data transfer between a subject second node of the plurality of second nodes and the host;
determining a second amount of data transfer between the subject second node and the first node; and
assigning a controller function, for executing processing of the access request, to one of the plurality of second nodes based on a comparison between the first amount of data transfer and the second amount of data transfer, wherein
the host and the first node are connected using a communication area including a low-speed communication area with low data communication performance,
in a case where the second amount of data transfer is increased larger than the first amount of data transfer, the controller function determines an assignment destination of the controller function to be the one of the plurality of second nodes connected to the first node using a high-speed communication area, and in a case where the second amount of data transfer is reduced smaller than the first amount of data transfer, the controller function determines the assignment destination of the controller function to be the one of the plurality of second nodes connected to the host using a high-speed communication area.

10. The controller assignment method according to claim 9, wherein the controller function includes at least one of a cache function, a data reduction function, and a redundancy function, and for the access request, the first amount of data transfer differs from the second amount of data transfer.

11. The controller assignment method according to claim 9, wherein connections between the host and the first node and at least one of the second nodes are made with narrower network bands than connections between other nodes, the first amount of data transfer is compared with the second amount of data transfer, in a case where the first amount of data transfer is larger than the second amount of data transfer, a node with the controller function executing the access processing is determined such that the connection between the host and the determined node does not include the connection with narrower network bands, and in a case where the second amount of data transfer is larger than the first amount of data transfer, the node with the controller function executing the access processing is determined such that the connection between the host and the determined node includes the connection with narrower network bands.

12. The controller assignment method according to claim 9, wherein in determination of an assignment destination of the node with the controller function executing the access processing on the storage, on a basis of a difference of the first amount of data transfer from network bands available between the one of the plurality of second nodes and the host and a difference of the second amount of data transfer from the network bands available between the one of the plurality of second nodes and the first node, the assignment destination of the node with the controller function is determined so to increase a difference of the amount of data transfer from the available network bands.

13. The controller assignment method according to claim 9, wherein an amount of data transfer is estimated on a basis of a schedule of internal processing executed by each of the plurality of second nodes through communication with the first node, the data transfer being expected to be performed between each of the plurality of second nodes and the first node for the internal processing until a predetermined future time, the estimated amount of data transfer is included in the second amount of data transfer, and on a basis of the first amount of data transfer and the second amount of data transfer, the one of the plurality of second nodes is assigned to be a node to which the controller function executing the access processing.

* * * * *